United States Patent
Strom

[11] Patent Number: 5,982,583
[45] Date of Patent: Nov. 9, 1999

[54] SLIDER HAVING THERMALLY APPLIED TENSILE STRESS FOR CURVATURE CONTROL AND METHOD OF APPLYING TENSILE STRESS

[75] Inventor: Richard A. Strom, Eagan, Minn.

[73] Assignee: Seagate Technology, Inc., Scotts Valley, Calif.

[21] Appl. No.: 08/910,729

[22] Filed: Aug. 13, 1997

Related U.S. Application Data

[63] Continuation-in-part of application No. 08/662,849, Jun. 12, 1996
[60] Provisional application No. 60/045,682, May 6, 1997.
[51] Int. Cl.$^6$ ........................................................ G11B 5/48
[52] U.S. Cl. ........................ 360/103; 360/104; 29/603.12; 29/898.13; 219/121.69
[58] Field of Search ........................ 29/603.12, 603.16, 29/898.13; 360/106, 103, 104; 219/121.69

[56] References Cited

U.S. PATENT DOCUMENTS

| | | | |
|---|---|---|---|
| 4,910,621 | 3/1990 | Matsuda et al. | 360/104 |
| 5,220,471 | 6/1993 | Matsuzaki | 360/103 |
| 5,237,476 | 8/1993 | Bischoff et al. | 360/126 |
| 5,256,850 | 10/1993 | Maegawa et al. | 219/121.69 |
| 5,303,105 | 4/1994 | Jorgenson | 360/106 |
| 5,442,850 | 8/1995 | Kerth | 29/603 |

OTHER PUBLICATIONS

Photograph of TDK TPC ABS slider from Quantum Fireball 2 Drive, publicly on sale at least as early as Jan. 1, 1996.
Photograph of TDK AAB slider from Pike Disc Drive, publicly on sale at least as early as Jan. 31, 1996.
R.W. Stinnett and E.L. Neau "Ion Beam Surface Treatment", QM Technologies Inc. An Interim Report, Summer 1996, pp. 1–16.
R. Ebbutt and S. Danyluk, Ilan Weisshaus, "Method to Evaluate Damage Induced By Dicing and Laser Cutting of Silicon Wafers".

*Primary Examiner*—S. Thomas Hughes
*Assistant Examiner*—Marc W. Butler
*Attorney, Agent, or Firm*—Westman, Champlin & Kelly, P.A.

[57] ABSTRACT

A method of controlling curvature of a disc head slider having a slider body with a bearing surface and a back surface, which is opposite to the bearing surface. The method includes melting and then cooling the back surface to add tensile stress to the back surface which induces curvature of the bearing surface.

18 Claims, 7 Drawing Sheets

Fig. 9 ent application claims priority from U.S. Provisional
SLIDER HAVING THERMALLY APPLIED TENSILE STRESS FOR CURVATURE CONTROL AND METHOD OF APPLYING TENSILE STRESS

CROSS-REFERENCE TO RELATED APPLICATION

This application claims priority from U.S. Provisional Application No. 60/045,682, filed May 6, 1997, and is a continuation-in-part of U.S. application Ser. No. 08/662, 849, filed Jun. 12, 1996, and entitled "Compressive Stress Treatment Method For Controlling Curvature Of A Hydrodynamic Bearing Slider."

BACKGROUND OF THE INVENTION

The present invention is related to disc drive data storage systems and, more particularly, to a method of controlling curvature of a hydrodynamic bearing slider.

Disc drives of the "Winchester" type are well known in the industry. Such drives use rigid discs coated with a magnetizable medium for storage of digital information in a plurality of circular, concentric data tracks. The discs are mounted on a spindle motor which causes the discs to spin and the surfaces of the discs to pass under respective head gimbal assemblies (HGAs). Head gimbal assemblies carry transducers which write information to and read information from the disc surface. An actuator mechanism moves the head gimbal assemblies from track to track across the surfaces of the discs under control of electronic circuitry. The actuator mechanism includes a track accessing arm and a load beam for each head gimbal assembly. The load beam provides a preload force which urges the head gimbal assembly toward the disc surface.

The head gimbal assembly includes a hydrodynamic (e.g. air) bearing slider and a gimbal. The gimbal is positioned between the slider and the load beam to provide a resilient connection that allows the slider to pitch and roll while following the topography of the disc. The slider includes a slider body having an air bearing surface which faces the disc surface. As the disc rotates, the disc drags air under the slider along the air bearing surface in a direction approximately parallel to the tangential velocity of the disc. Skin friction on the air bearing surface causes the air pressure between the disc and the air bearing surface to increase which creates a hydrodynamic lifting force that causes the slider to lift and fly above the disc surface. The preload force supplied by the load beam counteracts the hydrodynamic lifting force. The preload force and the hydrodynamic lifting force reach an equilibrium which determines the flying height of the slider. The transducer is typically mounted at or near the trailing edge of the slider.

Flying height is viewed as one of the most critical parameters of contact and non-contact recording. As the average flying height of the slider decreases, the transducer achieves greater resolution between the individual data bit locations on the disc. Therefore, it is desirable to have the transducers fly as close to the disc as possible. Flying height is preferably uniform regardless of variable flying conditions, such as tangential velocity variation from inside to outside tracks, lateral slider movement during seek operations and air bearing skew angles.

In certain applications, it is desirable to fabricate the slider such that the bearing surface has a positive curvature along the length and width of the slider. Length curvature is known as crown curvature. Width curvature is known as camber or cross curvature. The proper setting and control of length and width curvature improves flying height variability over varying conditions, improves wear on the slider and the disc surface, and improves takeoff performance by reducing stiction between the slider and the disc surface. In a typical slider fabrication process, length or width curvature is created by lapping the bearing surface on a spherically-shaped lapping surface or on a flat lapping surface while rocking the slider body back and forth in the direction of the desired curvature. The amount of curvature is determined by the radius of the rocking rotation. This lapping process is difficult to control and results in large manufacturing tolerances. More efficient and controllable methods of effecting air bearing surface curvature are desired.

U.S. Pat. No. 5,442,850 discloses inducing a preselected amount of compressive stress within a selected section of the bearing surface by impinging the section with a plurality of particles for a preselected amount of time. U.S. Pat. No. 4,910,621 discloses a method of producing curvature in a slider by creating a groove in the leading edge of the slider, placing a sealing material in the groove and then melting and stiffening the sealing material in the groove. The sealing material has an adhesive property upon melting and a shrinking property upon stiffening which causes lengthwise curvature at the leading edge of the slider. U.S. Pat. No. 5,220,471 discloses a slider having a longitudinal linear groove formed in a surface which is opposite the disc-opposing surface. The groove creates tensile stresses which cause the disc-opposing surface of the slider to be a curved surface in a convex form.

SUMMARY OF THE INVENTION

One aspect of the present invention includes a method of controlling curvature of a disc head slider having a slider body with a bearing surface and a back surface, which is opposite to the bearing surface. The method includes melting and then cooling the back surface to add tensile stress to the back surface which induces curvature of the bearing surface.

In one embodiment, stress relief cracks are induced in the back surface. The stress relief cracks are oriented predominately parallel to a crown curvature axis of the slider body such that the cracks relieve the added tensile stress in a direction perpendicular to the crown curvature axis to a greater extent than in a direction parallel to the crown curvature axis.

The tensile stress and stress relief cracks are added to the back surface by scanning a laser beam across the back surface in a direction generally parallel to the crown curvature axis. In one preferred embodiment, the laser beam is scanned in a continuous wave mode in a raster scan pattern having a plurality of scan lines which are parallel to the crown curvature axis and have centers which are spaced from one another.

Another aspect of the present invention includes a disc head slider having a slider body with a longitudinal axis, a bearing surface and a back surface which is opposite to the bearing surface. The back surface includes thermally applied tensile stress and stress relief cracks. The stress relief cracks are induced by the tensile stress and are predominately oriented in a direction substantially parallel to the longitudinal axis.

DETAILED DESCRIPTION OF THE PREFERRED EMBODIMENTS

Figure 1:
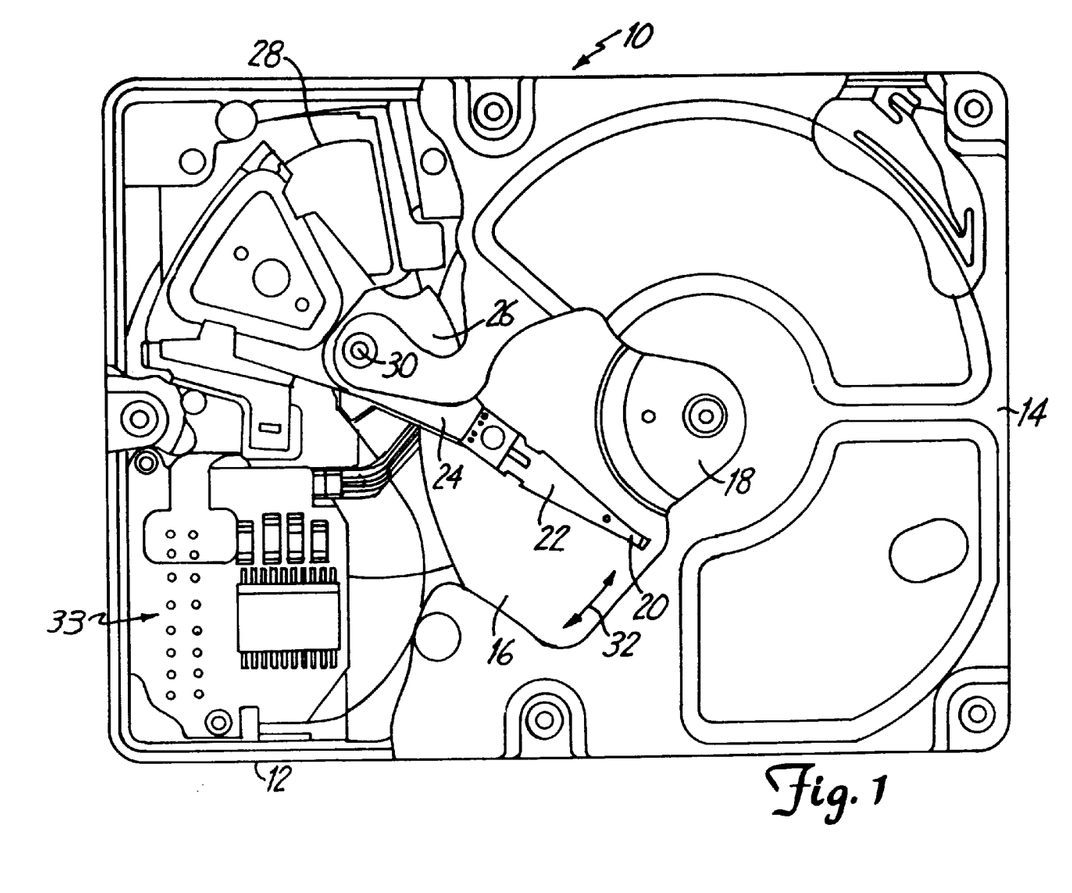
FIG. 1 is a plan view of a typical disc drive in which a hydrodynamic bearing slider fabricated according to the present invention is useful.

FIG. 1 is a plan view of a typical disc drive 10 in which a hydrodynamic bearing slider fabricated according to the present invention is useful. Disc drive 10 includes a housing with a base 12 and a top cover 14 (portions of top cover 14 are removed for clarity). Disc drive 10 further includes a disc pack 16 which is mounted on a spindle motor (not shown) by a disc clamp 18. Disc pack 16 includes a plurality of individual discs which are mounted for co-rotation about a central axis. Each disc surface has an associated head gimbal assembly (HGA) 20 which is mounted to disc drive 10 for communicating with the disc surface. In the example shown in FIG. 1, HGAs 20 are supported by load beam flexures 22 which are in turn attached to track accessing arms 24 of an actuator 26. The actuator shown in FIG. 1 is of the type known as a rotary moving coil actuator and includes a voice coil motor (VCM), shown generally at 28. Voice coil motor 28 rotates actuator 26 with its attached heads 20 about a pivot shaft 30 to position heads 20 over a desired data track along an arcuate path 32 under the control of electronic circuitry 33.

Figure 2:
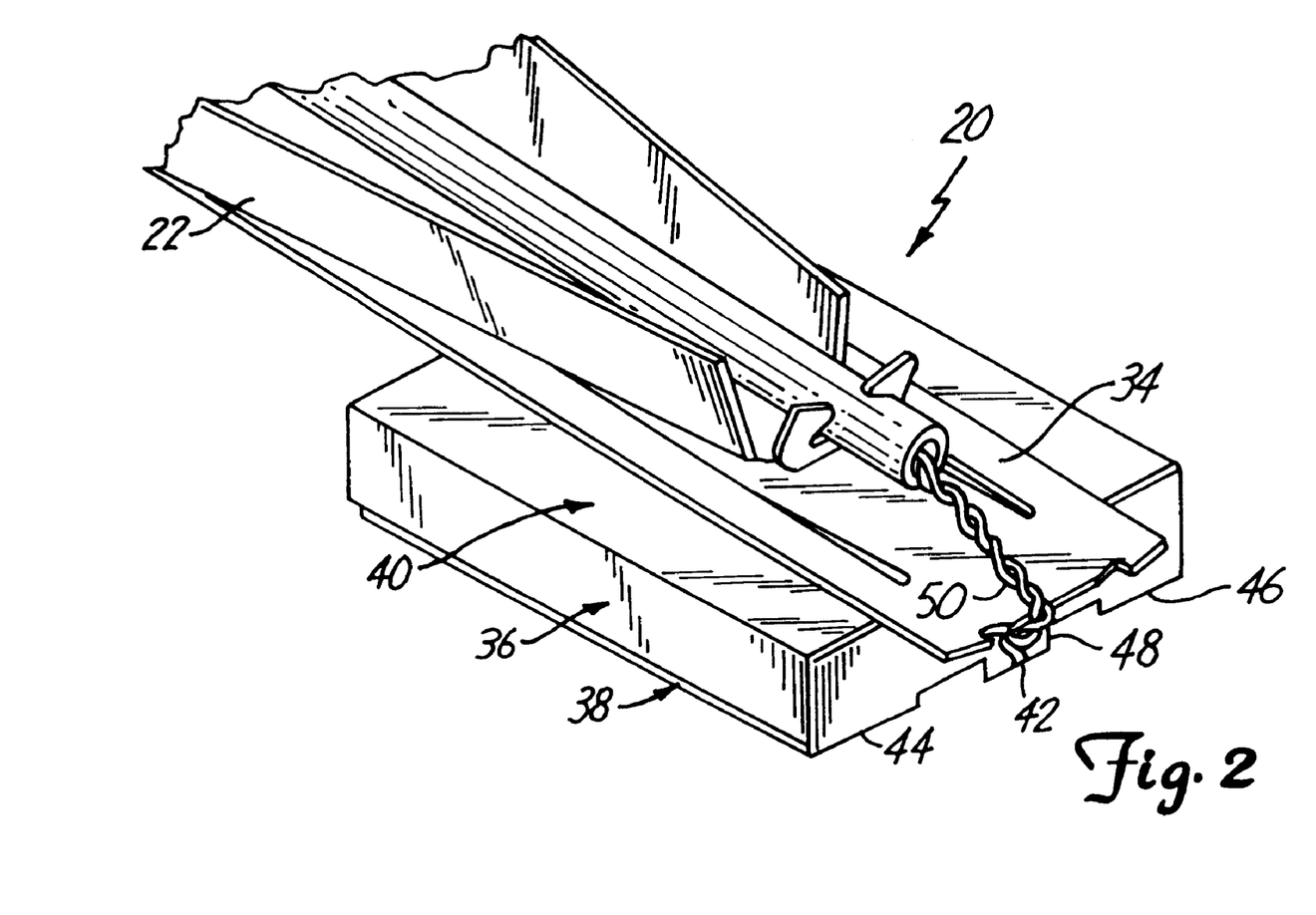
FIG. 2 is a perspective view of head gimbal assembly supported by a load beam flexure.

FIG. 2 shows head gimbal assembly 20 in greater detail. Load beam 22 provides a preload force which urges head gimbal assembly 20 toward the disc surface. Assembly 20 includes a gimbal 34 and a slider 36. Gimbal 34 is positioned between slider 36 and load beam 22 to provide a resilient connection that allows the slider to follow the topography of the disc. Slider 36 includes air bearing surface 38, back surface 40 and transducer 42. Bearing surface 38 includes first and second raised side rails 44 and 46 and raised center pad 48. Transducer 42 is fabricated on a trailing end of center pad 48. Transducer 42 is electrically coupled to leads 50. Transducer 42 communicates with individual bit positions on the surface of disc 16 as they pass beneath slider 36. Transducer 42 can include a thin film or a magnetoresistive magnetic head, for example.

Figure 3:
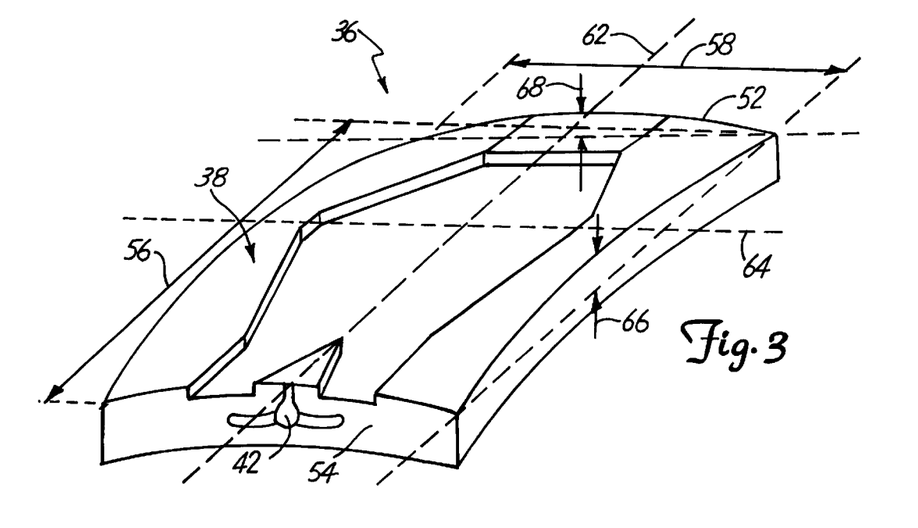
FIG. 3 is a perspective view of a slider having a bearing surface with a length and width curvature.

FIG. 3 is a perspective view of slider 36, as viewed from bearing surface 38. Slider 36 has a leading surface 52, a trailing surface 54, a length 56 and a width 58. Slider 36 preferably has a positive curvature along crown curvature axis 62 and along cross curvature axis 64. Crown curvature axis 62 extends along length 56 of slider 36, while cross curvature axis extends along width 58 of slider 36. With a positive curvature, air bearing surface 38 has an overall convex shape. A common measurement of the crown curvature along length 56 and the cross curvature along width 58 is the difference between the highest point along the length and width and the lowest point along the length and width, respectively. The height difference along the crown curvature ("crown height") is shown at 66. The height difference along the cross curvature ("cross height") is shown at 68. Typical crown and cross heights are on the order of zero to 1.5 microinches for a "30 series" slider having a length of 49 mils and a width of 39 mils.

Figure 4A:
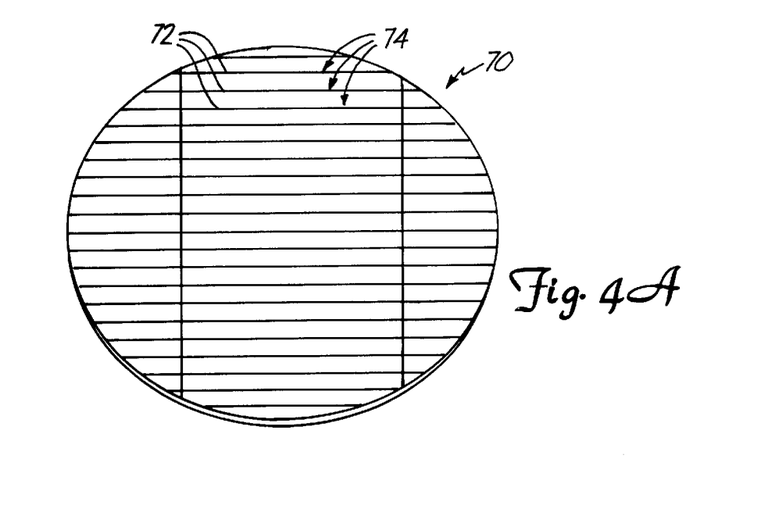
FIG. 4A is a perspective view of a wafer from which the slider shown in FIG. 3 is formed.
Figure 4B:
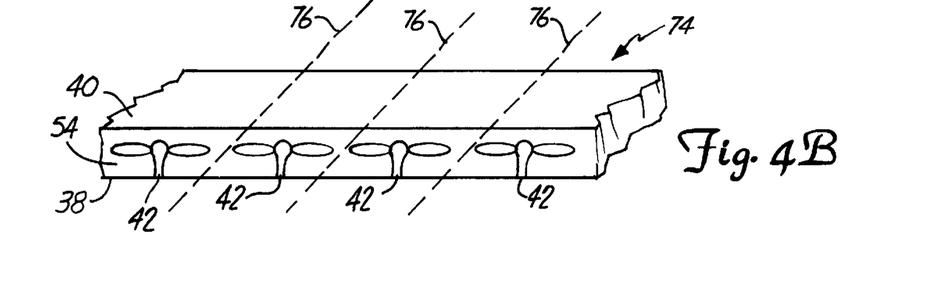
FIG. 4B is a fragmentary perspective view of a bar of sliders sliced from the wafer shown in FIG. 4A.

The crown curvature and the cross curvature are formed during fabrication of the slider body. The slider body is formed from a substrate known as a wafer. FIG. 4A is a perspective view of a typical wafer 70. A matrix of transducers (not shown) is applied to the top surface of wafer 70. Wafer 70 is then sliced along rows 72 into a plurality of bars 74. Each bar 74 includes a plurality of individual slider bodies, with each slider body having a corresponding transducer 42 as shown in FIG. 4B. The sliced surfaces become bearing surface 38 and back surface 40, while the top surface of wafer 70 becomes trailing surface 54 of each slider body. The slicing process induces non-uniform surface stress in bearing surface 38 and back surface 40 due to plastic deformation of the surfaces. This surface stress is typically compressive.

Once wafer 70 has been sliced into individual bars 74, the bearing surface 38 of each bar is machined by a lapping process prior to forming the air bearing features. The lapping process is controlled to obtain a target throat height for each transducer 42. The throat heights are preferably uniform for each transducer in the bar. However, if the bar is not uniformly flat prior to the lapping process, but includes some waviness, a twist or a bow due to the non-uniform compressive surface stress formed by the slicing process, it is difficult, if not impossible, to control the lapping process to achieve a uniform throat height. Once bars 74 are lapped flat, each bar 74 is diced along a plurality of dice lanes 76 (shown in FIG. 4B) into the plurality of individual slider bodies. The slicing and dicing operations are typically performed with a diamond-tipped saw blade.

Figure 5:
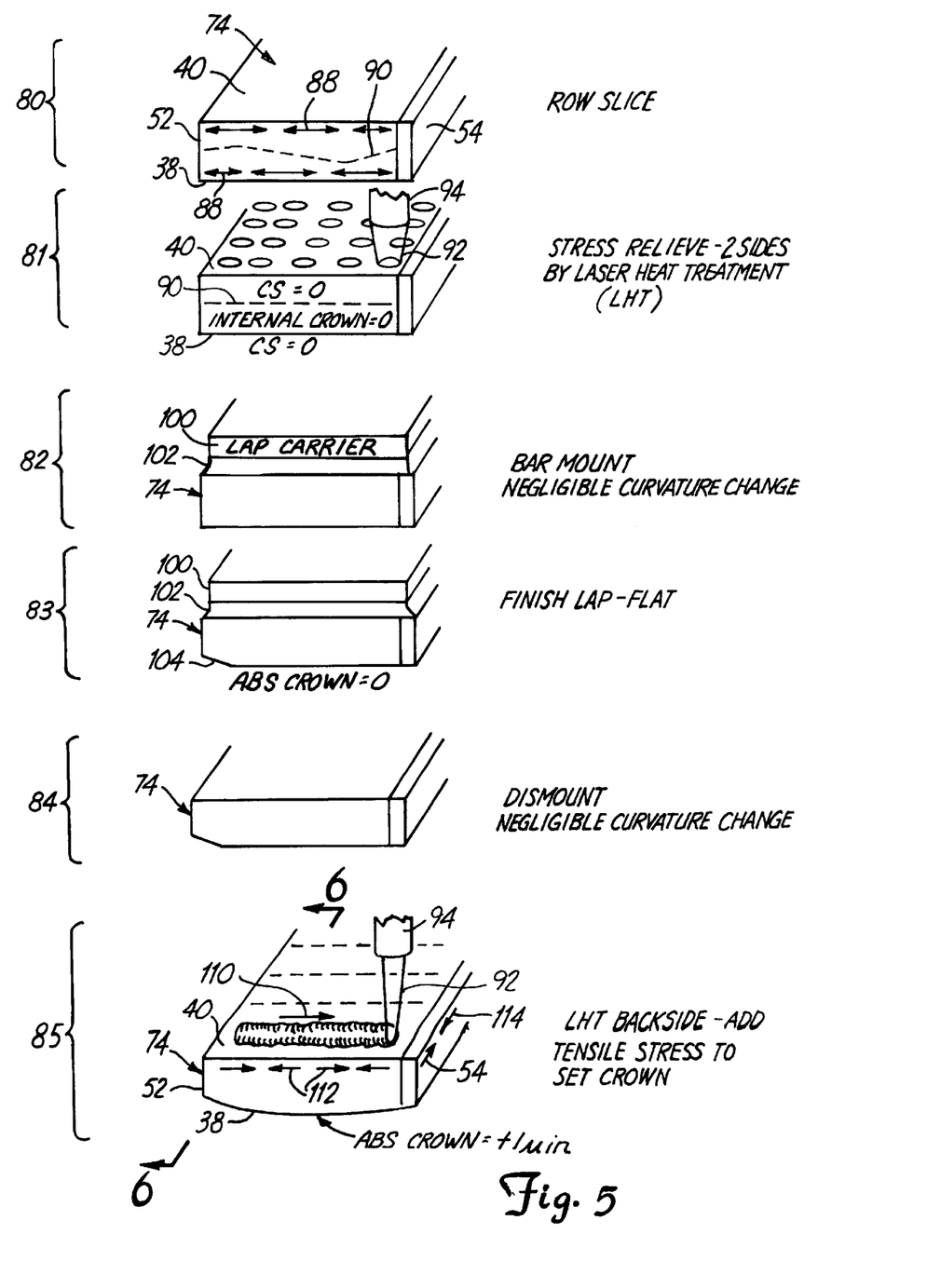
FIG. 5 is a flow chart which illustrates a slider fabrication process of the present invention.

FIG. 5 is a flow chart which illustrates a slider fabrication process of the present invention, which induces an accurately controlled positive curvature in bearing surface 38. FIG. 5 includes an end view of bar 74 after each process step 80–85. At step 80, bar 74 is shown after it is formed by a row slice operation. Arrows 88 represent compressive surface stress induced in the air bearing surface 38 and the back surface 40 by the row slice operation. The varying length of arrows 88 illustrate the non-uniform nature of the compressive surface stress. The non-uniform stress results in a non-uniform internal crown 90 from leading surface 52 to trailing surface 54.

At step 81, bearing surface 38 and back surface 40 are stress relieved by thermal surface relaxation. Thermal surface relaxation relieves stress in the surface by melting or vaporizing the stressed material. In one embodiment, the bulk material of bar 74 includes aluminum oxide and titanium carbide, which has a very high melting point (>2000° C.). The transducer mounted to the bulk material has a damage temperature of about 150° C. Therefore, thermal relaxation treatment should be localized to the bearing surface and the back surface.

In the embodiment shown in FIG. 5, thermal surface relaxation is performed through laser heat treatment. A beam of laser light 92 is directed from a YAG laser 94 toward bearing surface 38 and back surface 40. The laser heat treatment applies radiation to the surface in the form of a high peak, short duration photon energy pulse which can be raster scanned back and forth in a serpentine pattern over surfaces 38 and 40 to melt and restructure a thin surface layer (about 2 $\mu$m deep) of the material on each surface without significantly increasing the temperature of the bulk material. This is referred to as "blanket" laser heat treatment. In one embodiment, laser spot 92 has a diameter of about 40 $\mu$m.

The melting and restructuring of the stressed material is believed to reduce or eliminate the compressive stresses that have been applied on the surface by plastic deformation, such as by scratching, lapping or grinding. It has been found that a melting depth of 0–3 $\mu$m is sufficient to remove the compressive stresses left by prior machining operations. This also results in a near zero internal crown 90. The laser spot energy density and the pulse duration are preferably adjusted to give adequate surface melting without removing any material. In an alternative embodiment, stress is relieved with higher energies that result in material vaporization and/or additional melting.

Any other method of removing or reducing compressive surface stress can also be used with the present invention. For example, compressive surface stress can be removed by removing the stressed or plastically deformed material, such as by fine lapping, ion milling or etching. Thermal surface relaxation or material removal by vaporization or ablation can be done by using lasers other than a pulsed YAG laser and by energy beam configurations other than small diameter scanning spots. $CO_2$ lasers and Eximer lasers are other examples of lasers that could be used. Also, a continuous wave laser beam can be used instead of a pulsed beam. These lasers have different wavelength energies and different beam characteristics which may be advantageous in specific applications and on specific materials.

At step 82, bar 74 is mounted to a lapping carrier 100 with an adhesive 102. Adhesive 102 is preferably flexible such that bar 74, and thus each slider body within the bar, is held in a relaxed state with little or no change in curvature caused by the adhesive.

At step 83, bar 74 is lapped flat such that air bearing surface 38 has a crown curvature of zero. Also, an optional leading edge taper 104 is lapped into air bearing surface 38. Leading edge taper may also be added in later processing steps by ion milling, for example. It has been found that good control and repeatability depends upon the ability of the mounted bar to relax in bonding adhesive 102 while the pre-existing surface stresses on the air bearing surface 38 are changing as the lapping progresses to the final state. At step 84, bar 74 is dismounted from lap carrier 100 with negligible curvature change.

At step 85, laser beam 92 is operated in a continuous wave mode and scanned over back surface 40 in a "vertical" scan direction 110 from leading surface 52 toward trailing surface 54. Scan direction 110 is parallel to the longitudinal or crown axis of the slider bodies within bar 74. In a preferred embodiment, laser beam 92 is scanned in a raster scan pattern having a plurality of scan lines which are spaced from one another along the cross curvature axis. The spacing of the scan lines is known as the scan pitch. The laser can be applied as a blanket adjustment along the entire bar 74 or a separate adjustment for each slider either before or after being diced into individual slider bodies. As discussed in more detail with reference to FIG. 6, laser beam 92 melts the surface of bar 74 which, when solidified, adds tensile stress in back surface 40. The added tensile stress results in a controlled change of the crown and cross curvature of bearing surface 38. Arrows 112 represent the tensile stress added to back surface 40 which is aligned with the crown curvature axis of the slider bodies. Arrows 114 represent the tensile stress added to back surface 40 which is aligned with the cross curvature axis of the slider bodies in bar 74.

Tensile stress increases significantly when a higher laser fluence (energy per unit area) and a higher laser spot interaction allow a greater amount of surface melting. Pulse width, pulse rate and spacing conditions of the laser beam are some of the more important factors affecting this interaction. The continuous wave mode of laser operation maximizes all of the these factors since the laser is on continuously. However, a pulsed laser can be used in alternative embodiments to impart large tensile stresses when the operating conditions of the laser are optimized.

Also, the power, spot density or line density can be reduced when applying laser heat treatment in step 81 to alter the amount of compressive surface stress remaining on back surface 40 or bearing surface 38 after the row slice operation. In addition, the scan direction can be altered. If some compressive surface stress is left on either back surface 40 or bearing surface 38, the remaining compressive surface stress can have an effect on the resultant crown and cross curvature that is achieved by adding tensile stress by laser heat treatment in step 85.

When the compressive surface stresses from the row slice operation are sufficiently uniform on back surface 40 and bearing surface 38, the laser heat treatment in step 81 may be eliminated to simplify the process in an alternative embodiment of the present invention. When this is done, the laser operating conditions in step 85 may require some changes so that the desired crown and cross curvature can be achieved. When laser 94 is operated in the continuous wave mode in step 85 to add tensile stress to back surface 40, the laser will also reduce or eliminate any preexisting compressive stress. Elimination of compressive stress on back surface 40 of bar 74 has a similar effect as adding tensile stress, and this will further increase the amount of curvature change that is achieved. In a simplified process, without step 81, it was found that changing the laser scan direction to a "horizontal" scan direction, which is perpendicular to scan direction 110, allows an increased cross curvature to be achieved for a given increase in crown curvature, which allowed the simplified process to achieve a particular curvature relationship.

Figure 6:
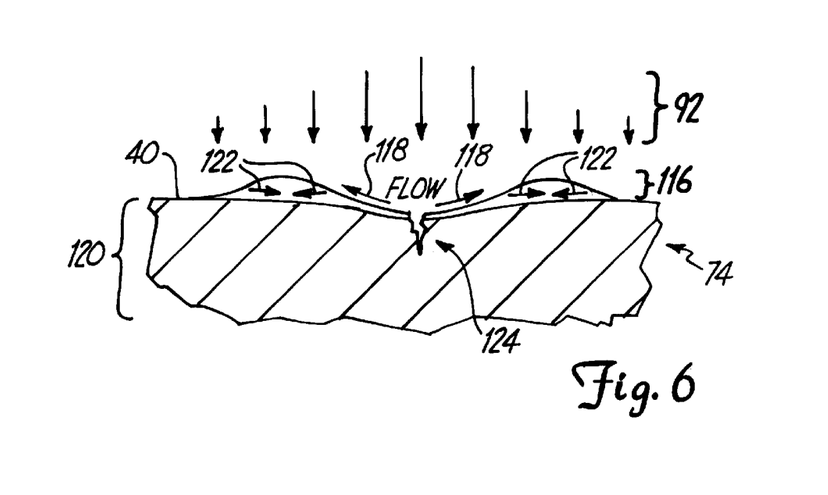
FIG. 6 is a fragmentary, cross sectional view of a bar taken along lines 6—6 of FIG. 5, which illustrates laser applied tensile stress for inducing curvature in the bar.

FIG. 6 is a fragmentary, cross sectional view of bar 74 taken along lines 6—6 of FIG. 5, at step 85. Laser beam 92 is scanned across back surface 40 of bar 74 in a direction into the page in FIG. 6, parallel to scan direction 110 (shown in FIG. 5). The laser is operated at a higher power level in step 85 than in step 81 and under conditions sufficient to melt a layer 116 on the surface of bar 74 and cause the molten material in layer 116 to flow toward the cooler outer edges of beam 92 in the direction indicated by arrows 118. As the melted surface layer 116 solidifies, it has a thermal contraction that is greater than the contraction of the cooler unmelted bulk material 120 of bar 74. The difference in thermal contraction creates tensile stress 122 which results in the controlled change in crown and cross curvature of the bearing surface. If the tensile stress is sufficiently high, it will cause stress relief cracks, such as crack 124, as the melted surface material cools. Stress relief crack 124 relieves some of the added tensile stress 122.

Figure 7:
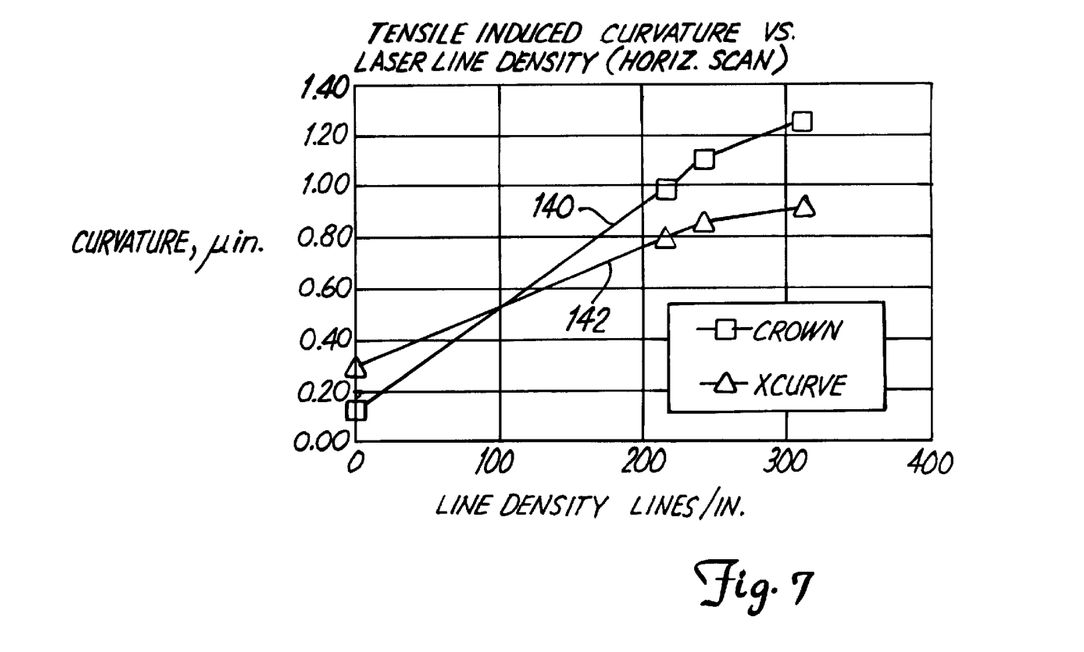
FIG. 7 is a graph showing curvature as a function of laser scan line density, according to one embodiment of the present invention.

FIG. 7 is a graph showing crown and cross curvature in microinches as a function of the laser scan line density in lines per inch for a plurality of bars that were fabricated during an experiment according to one embodiment of the present invention. In the experiment, a 5-watt continuous wave laser was scanned across the back surface of each bar in a horizontal direction parallel to the cross curvature axis, as opposed to a vertical direction parallel to the crown curvature axis. Line 140 represents the resulting crown curvature, and line 142 represents the resulting cross curvature. Looking at line 140, raster scanning the 5-watt continuous wave laser parallel to the cross-curvature axis with a line density of 217 lines per inch resulted in a desired 1.0 microinch crown height. The five bars that were scanned with a line density of 217 lines per inch hit the 1.0 microinch average crown height with a total sigma of 0.12 microinches.

However, the average cross height of these bars was 0.77 microinches, which was higher than a maximum specification of 0.75 microinches in one application of the present invention. In order to achieve the desired crown curvature without a large change in cross curvature, the fabrication process of the present invention preferably adds tensile stress with a large anisotropy. Anisotropy is defined as the ratio of the change in crown curvature to the change in cross curvature. In the graph shown in FIG. 7, the laser operating conditions and scan direction resulted in a tensile stress anisotropy of 1.7.

Figure 8A:
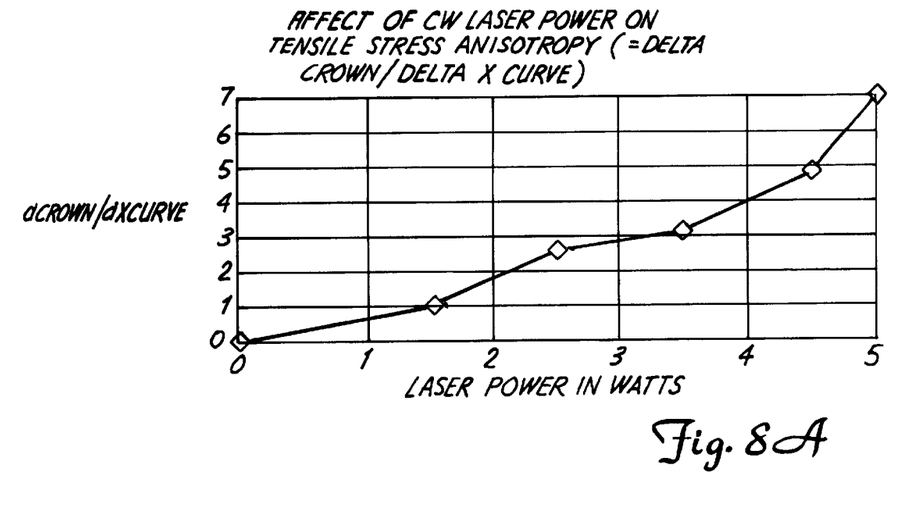
FIG. 8A is a graph illustrating tensile stress anisotropy as a function of laser power, according to another embodiment of the present invention.

It has been found that increasing the laser fluence (by adjusting the focus and power of the laser beam) and changing the scan direction from horizontal to vertical as shown at step 85 in FIG. 5, a larger anisotropy can be achieved. FIG. 8A is a graph illustrating tensile stress anisotropy as a function of laser power in watts. The laser was operated as a continuous wave having a vertical scan direction similar to that shown in FIG. 5, an "in focus" beam of about 1.5 mils wide and a scan line pitch of 3.2 mils. As shown in FIG. 8A, tensile stress anisotropy increases with laser power.

Figure 8B:
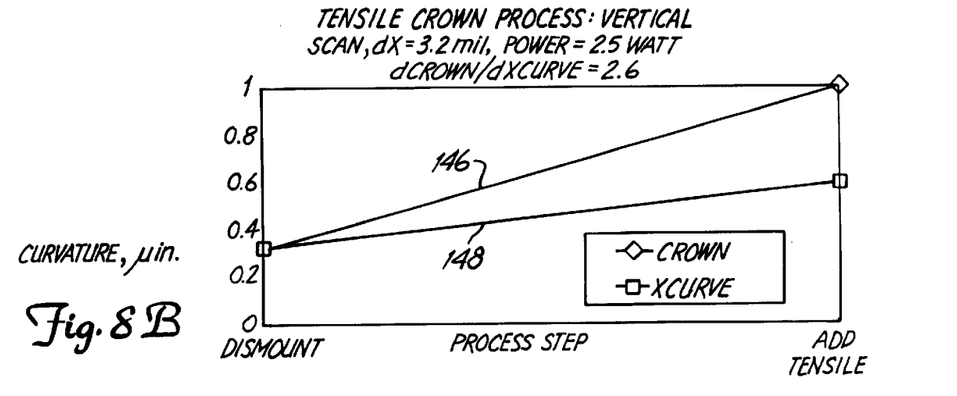
FIG. 8B is graph illustrating crown and cross curvature according to the embodiment shown in FIG. 8A.

FIG. 8B is graph which illustrates crown and cross curvature before and after adding tensile stress. The vertical axis on the left shows crown and cross curvature prior to adding tensile stress. The vertical axis on the right shows crown and cross curvature after adding tensile stress. Line 146 represents the crown curvature, and line 148 represents the cross curvature. As in FIG. 8A, the laser beam was scanned in the vertical direction parallel to the crown curvature axis with a scan pitch of 3.2 mils and power level of 2.5 watts. The change in crown curvature divided by the change in cross curvature (the level of anisotropy) increased to 2.6. This lowered the final cross height from 0.77 to 0.59 microinches for the same 1.0 microinch crown height relative to the example shown in FIG. 7.

Figure 9:
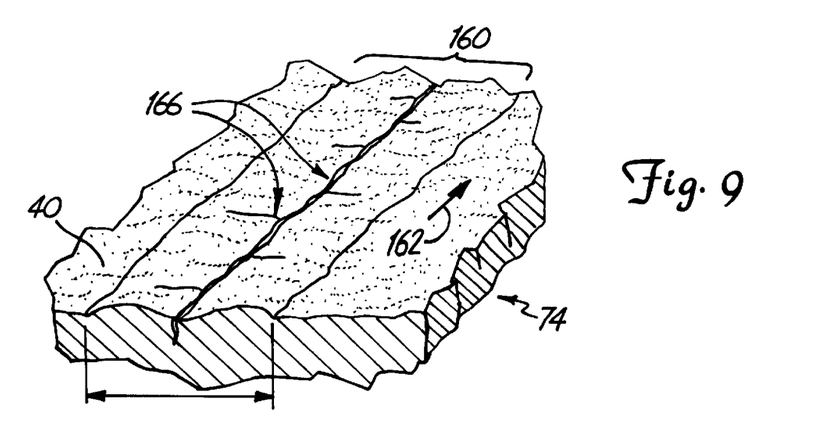
FIG. 9 is a perspective view of a back surface of the bar which illustrates orientation of stress relief cracks in the back surface relative to the scan direction of the laser beam.

It has also been found that the stress relief cracks discussed with reference to FIG. 6 play an important role in the control of tensile stress anisotropy. FIG. 9 is a fragmentary, perspective view of the back surface of bar 74, which illustrates orientation of the stress relief cracks relative to the scan direction of the laser beam. Bar 74 has a laser melt line 160 with a scan direction 162 and a scan line width 164. Tensile stress added to back surface 40 by the laser treatment creates a plurality of stress relief cracks 166 which are predominately aligned parallel to scan direction 162. These stress relief cracks will therefore relieve more tensile stress in a direction perpendicular to scan direction 162 than in a direction parallel to scan direction 162. If the scan direction is oriented parallel to the crown curvature axis, a large change in crown curvature can be achieved with a small change in cross curvature. Also, the stress relief cracks appear to become more strongly orientated in the scan direction as the laser power or fluence increases. Therefore, increasing the laser power results in increased tensile stress anisotropy.

Figure 10:
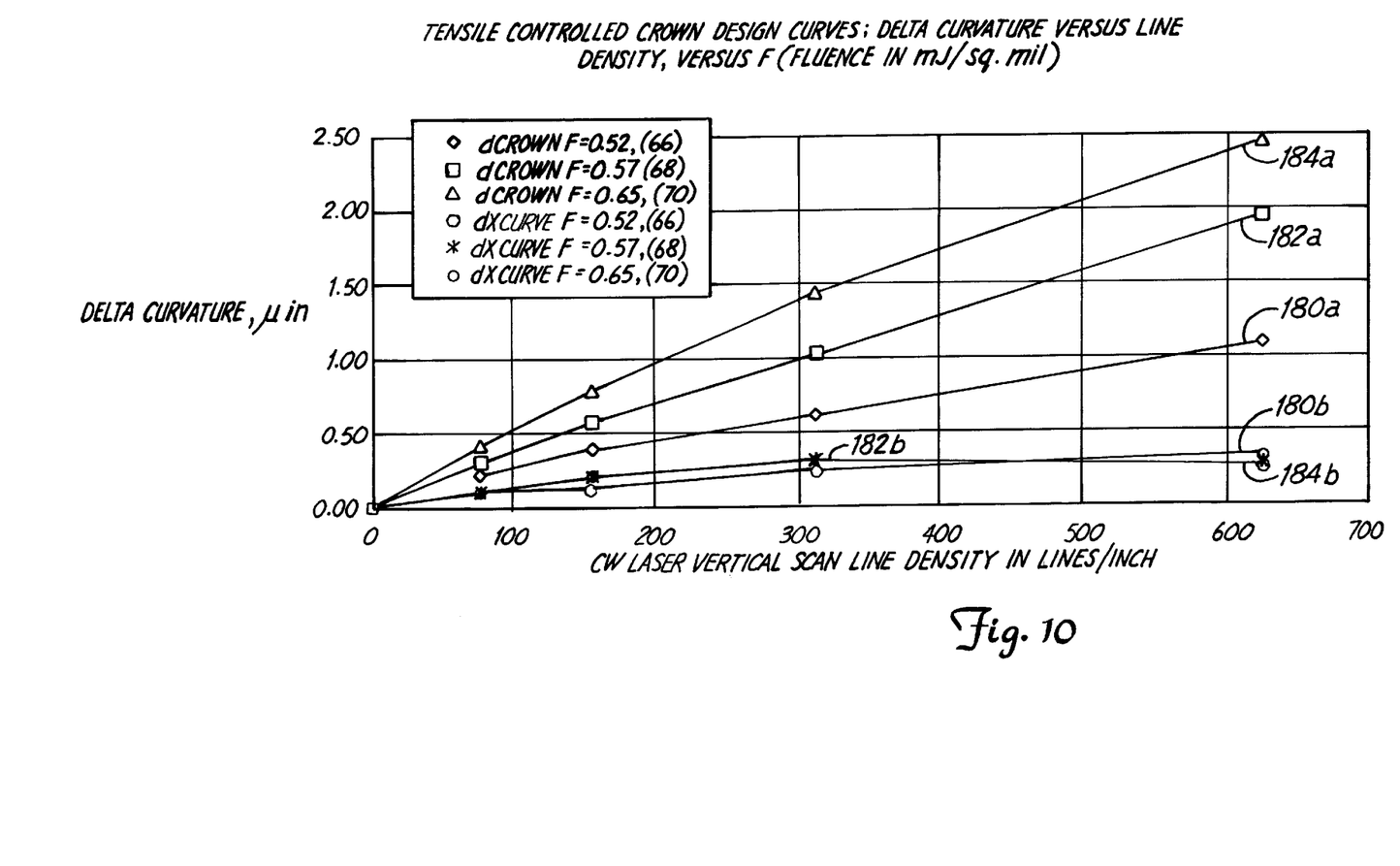
FIG. 10 is graph which illustrates the change in crown and cross curvature as a function of laser scan line density and laser fluence.

FIG. 10 is a graph which illustrates the results of an experiment measuring crown and cross curvature as a function of line density and laser fluence. Laser fluence was used instead of power because it accounts for an increase in laser scan line width as the energy of the laser beam is increased. A continuous wave ESI laser was used, and the scan direction was parallel to the crown curvature axis.

Curves 180A and 180B represent the change in crown curvature and the change in cross curvature, respectively, with a laser fluence of 0.52 mJ/sq mil. Curves 182A and 182B represent the change in crown curvature and the change in cross curvature, respectively, with a laser fluence of 0.57 mJ/sq mil. Curves 184A and 184B represent the change in crown curvature and the change in cross curvature, respectively, with a laser fluence of 0.65 mJ/sq mil.

From the results shown in FIG. 10, a specific crown curvature increase from 0 to 2.5 microinches can be induced by selecting a particular fluence level and line density. With these operating conditions, the cross curvature, although slightly affected, does not exceed a total change of about 0.03 microinches. The cross curvature therefore exhibits a "saturation effect" which is explained by the preferential anisotropic stress relief cracking shown in FIG. 9.

In the fabrication process of the present invention, the application of tensile stress using a continuous wave YAG laser to condition the back surface of a bar of slider material after it has been lapped flat yields a final air bearing surface curvature that is comparable to current processes. Tensile stress anisotropy allows a large change in crown curvature for a small change in cross curvature and can be achieved through selective stress relief cracking by choosing an optimum laser fluence and scan direction.

In an alternative embodiment of the present invention, tensile stress anisotropy is achieved by shaping a pulsed laser beam. Diffractive optics are used to change shape of the beam from a round Gaussian energy distribution to a narrow rectangular or elongated Gaussian energy distribution. The pulsed, rectangular beam is orientated with its long axis parallel to the crown curvature axis and then scanned in a direction parallel to the cross curvature axis. The pulse rate and scan rate are adjusted to achieve the desired line density needed for tensile stress curvature control.

Since the crown and cross curvature are dependent on stress relief cracking, it may desirable to stabilize the crown and cross curvature in some applications. One potential method of stabilizing the curvature is to apply an additional laser treatment or other thermal treatment to the back surface which is similar to step 81 shown in FIG. 5. In addition to stabilizing the curvature, this thermal treatment would remelt the cracked surface which may reduce debris shedding potential.

Although the present invention has been described with reference to preferred embodiments, workers skilled in the art will recognize that changes may be made in form and detail without departing from the spirit and scope of the invention.

What is claimed is:

1. A method of controlling curvature of a disc head slider having a slider body with a bearing surface, a back surface, which is opposite to the bearing surface, a crown curvature axis and a cross curvature axis, the method comprising:

melting and then cooling the back surface to add tensile stress to the back surface which induces curvature of the bearing surface, wherein the steps of melting and cooling are controlled such that the tensile stress is sufficient to induce tensile stress relief cracks in the back surface and such that the tensile stress relief cracks are oriented predominately parallel to the crown curvature axis and relieve the tensile stress in a direction parallel to the cross curvature axis to a treater extent than in a direction parallel to the crown curvature axis.

2. The method of claim 1 wherein the step of melting comprises directing a laser beam toward the back surface.

3. The method of claim 2 wherein the step of directing comprises directing a continuous wave laser beam toward the back surface.

4. The method of claim 2 wherein:

the step of directing comprises scanning the laser beam across the back surface in a direction generally parallel to the crown curvature axis.

5. The method of claim 4 wherein:

the step of scanning comprises scanning the laser beam in a raster scan pattern having a plurality of scan lines which are parallel to the crown curvature axis and have centers which are spaced from one another along the cross curvature axis.

6. The method of claim 2 wherein the step of directing comprises directing a pulsed laser beam toward the back surface.

7. The method of claim 6 wherein the pulsed laser beam has a round beam shape with a Gaussian energy distribution.

8. The method of claim 6 wherein the slider body has a crown curvature axis and a cross curvature axis and wherein the step of directing further comprises:

directing a pulsed laser beam having an elongated beam shape toward the back surface, with a long axis of the beam shape being parallel to the crown curvature axis; and scanning the pulsed laser beam across the back surface in a direction generally parallel to the cross curvature axis.

9. The method of claim 1 wherein the steps of melting and cooling comprise adding anisotropic tensile stress to the back surface which is oriented predominately parallel to the crown curvature axis.

10. The method of claim 1 and further comprising:

forming a wafer comprising a slider substrate material;

slicing the wafer into a plurality of bars, each bar comprising a plurality of individual slider bodies and two opposite sliced surfaces which form the bearing surface and the back surface of the slider bodies; and performing the steps of melting and cooling on each bar.

11. The method of claim 10 wherein each bar has a length and a width and wherein the step of melting comprises scanning a laser beam across the width of the bar.

12. The method of claim 11 wherein the step of scanning comprises scanning the laser beam in a raster scan pattern having a plurality of scan lines which are oriented generally along the width of the bar and have centers which are spaced from one another along the length of the bar.

13. A method of controlling curvature of a disc head slider having a slider body with a bearing surface, a back surface which is opposite to the bearing surface, a cross curvature axis, and a crown curvature axis, the method comprising:

adding anisotropic tensile stress to the back surface which is aligned predominately parallel to the crown curvature axis to induce curvature in the bearing surface to a greater extent along the crown curvature axis than along the cross curvature axis.

14. A method of controlling curvature of a disc head slider having a slider body with a bearing surface, a back surface which is opposite to the bearing surface, a crown curvature axis and a cross curvature axis, the method comprising:

adding tensile stress to the back surface to induce curvature in the bearing surface; and inducing tensile stress relieving cracks in the back surface which are predominately aligned with the crown curvature axis, whereby the induced curvature in the bearing surface is greater along the crown curvature axis than along the cross curvature axis.

15. A disc head slider comprising:

a slider body comprising a longitudinal axis, a bearing surface and a back surface which is opposite to the bearing surface;

thermally applied tensile stress in the back surface; and stress relief cracks in the back surface which are induced by the tensile stress and are predominately oriented in a direction substantially parallel to the longitudinal axis, wherein the bearing surface has a curvature which is induced by the tensile stress and is greater in a direction along the longitudinal axis than in a direction perpendicular to the longitudinal axis.

16. The disc head slider of claim 15 wherein the back surface is laser heat treated.

17. The disc head slider of claim 15 wherein the bearing surface has a positive crown curvature along the longitudinal axis which is induced by the tensile stress in the back surface.

18. The disc head slider of claim 15 wherein:

the stress relief cracks relieve the tensile stress in the back surface in a direction that is perpendicular to the longitudinal axis more than in a direction parallel to the longitudinal axis such that the tensile stress in the back surface is substantially anisotropic and aligned with the longitudinal axis.

* * * * *

UNITED STATES PATENT AND TRADEMARK OFFICE
CERTIFICATE OF CORRECTION

PATENT NO. : 5,982,583
DATED : November 9, 1999
INVENTOR(S) : Richard A. Strom

It is certified that error appears in the above-identified patent and that said Letters Patent is hereby corrected as shown below:

Col. 9, line 14, delete "treater" and insert --greater--.

Signed and Sealed this

Sixth Day of March, 2001

Attest:

NICHOLAS P. GODICI

Attesting Officer      Acting Director of the United States Patent and Trademark Office